United States Patent
Herr et al.

[11] 3,827,748
[45] Aug. 6, 1974

[54] REINFORCED SUN VISOR, ESPECIALLY FOR MOTOR VEHICLES

[75] Inventors: Gerhard Herr, Wuppertal-Vohwinkel; Willy O. Treber, Wuppertal-Elberfeld, both of Germany

[73] Assignee: Gebr. Happich GmbH, Wuppertal-Elberfeld, Germany

[22] Filed: Mar. 28, 1972

[21] Appl. No.: 238,794

Related U.S. Application Data

[63] Continuation-in-part of Ser. No. 126,465, March 22, 1971, abandoned.

[30] Foreign Application Priority Data
July 24, 1970  Germany............................ 2036772

[52] U.S. Cl. ............................................ 296/97 H
[51] Int. Cl............................................ B60j 3/00
[58] Field of Search............. 296/97 H, 97 R, 97 K; 160/DIG. 3; 220/4 E; 161/159

[56] References Cited
UNITED STATES PATENTS

| | | | |
|---|---|---|---|
| 3,252,568 | 5/1966 | Steidinger .......................... | 220/4 E |
| 3,405,969 | 10/1968 | Creel ................................ | 296/97 H |

FOREIGN PATENTS OR APPLICATIONS

| | | | |
|---|---|---|---|
| 1,214,327 | 2/1970 | Great Britain .................... | 296/97 H |
| 790,534 | 2/1958 | Great Britain .................... | 296/97 H |
| 999,331 | 7/1965 | Great Britain .................... | 296/97 H |
| 1,085,136 | 9/1967 | Great Britain .................... | 296/97 H |
| 1,087,116 | 10/1967 | Great Britain .................... | 296/97 H |
| 1,027,889 | 4/1966 | Great Britain ..................... | 220/4 E |
| 40,104 | 7/1965 | Germany .......................... | 296/97 H |

*Primary Examiner*—David Schonberg
*Assistant Examiner*—John A. Pekar
*Attorney, Agent, or Firm*—Ostrolenk, Faber, Gerb & Soffen

[57] ABSTRACT

A reinforced sun visor comprising two superposed layers of foamed material sandwiching a wire reinforcing insert between them. In one embodiment the layers are held together at their edge by a foldable hinge. The facing surfaces of the layers are grooved to conform to the shape of the reinforcing insert and to receive the insert. The facing surfaces are in contact with each other while the insert is in place. One facing surface carries at least one projection and the other includes a correspondingly positioned and shaped depression. These elements cooperate to hold the visor body layers together and prevent respective lateral shifting. The invention also concerns a method of making a visor including molding the appropriately shaped visor body, emplacing the insert and folding the body sections together.

15 Claims, 6 Drawing Figures

PATENTED AUG 6 1974

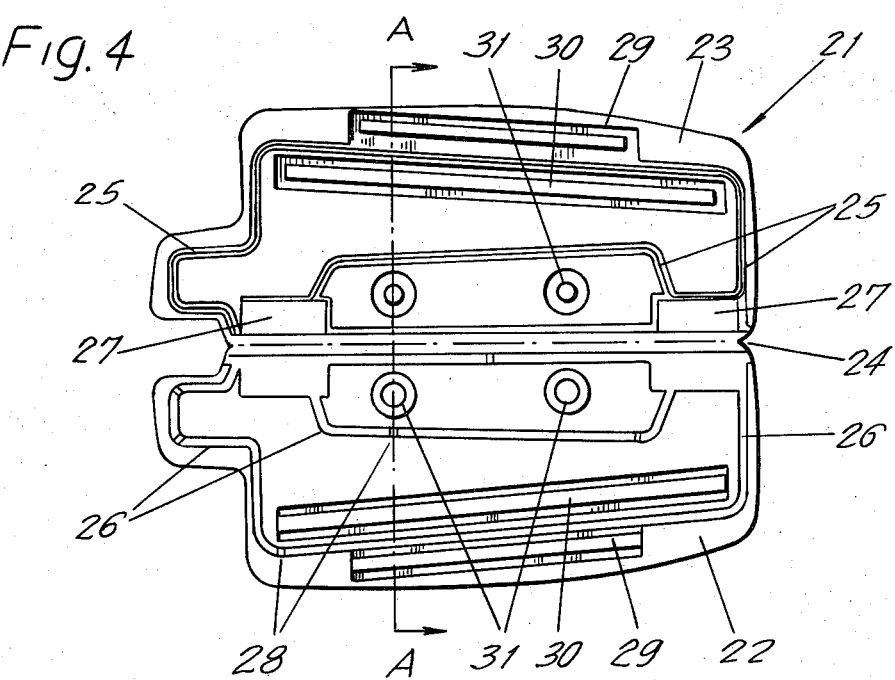
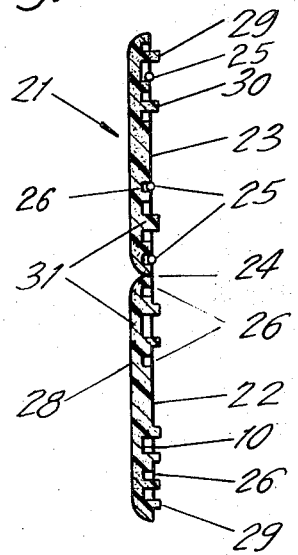
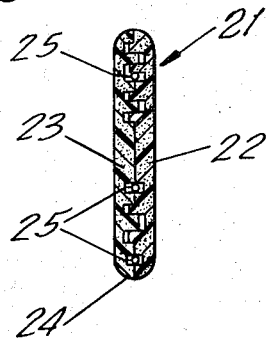

REINFORCED SUN VISOR, ESPECIALLY FOR MOTOR VEHICLES

This is a continuation-in-part of application Ser. No. 126,465, filed Mar. 22, 1971 now abandoned.

This invention relates to a reinforced padded sun visor for motor vehicles, such as automobiles and trucks, or the like. The invention also relates to a method for producing such a visor.

A sun visor usually has a generally rectangular shape and flat contour. It includes a relatively stiff inner reinforcing insert or frame which is connected by appropriate hinges to the vehicle. The frame is covered by layers of foamed polymer or plastic material. These layers are usually wrapped with an exterior covering of polymer or plastic material which is bonded to the exterior surfaces of the layers within. The padded visor is usually of one piece, seamless and closed all around, except for one side for insertion, and it has the contours and dimensions of the sun visor. See U.S. application Ser. No. 32,607, filed Apr. 28, 1970, now Pat. No. 3,716,269.

Constructing a padded sun visor as a pocket-like unit has many advantages, including simplicity of manufacture of the visor body, centrally located reception for the reinforcing inner insert, seamless design provided with natural edges of the visor body made in its final shape and a simple and light additional covering with a foil. The time required as compared with other processes for producing sun visors is substantially less.

A disadvantage of the above described structure, however, has been that the normally used thin wire type reinforcing insert within the single-chambered hollow space of the visor has large hollow spaces around it, whereby the padded visor body is only partially reinforced. Also, the opening for introducing the reinforcing liner into the padded body must be later closed to obtain the maximum strength in this area and the additional foil-like covering is not sufficient to span the opening alone.

It is an object of the invention to provide a padded sun visor having the desired rigidity and which at the same time ensures minimal negative results from an open space between the padding layers.

It is another object of the present invention to provide such a sun visor comprised of two facing layers where there is minimal open space between the layers which might weaken the visor.

It is a further object of the present invention to ensure that a visor comprised of two facing layers of foamed material, or the like, is adequately secured together to prevent the layers from separating or shifting laterally with respect to each other.

In accordance with the invention, the foamed padding visor body is formed of two superposed layers of foamed material. Confining grooves, contoured to the shape of the reinforcing insert, are formed in at least one, and usually both of the facing interior surfaces of the layers for receiving the reinforcing insert. The insert is positioned and fixed immediately upon being inserted into the padded body. The remaining surface areas of the interior facing surfaces of both of the layers are in contact, and the two layers may be affixed to each other along these entire interior surfaces. It is possible to either glue the facing surfaces of the sections of the visor together or to hold them together simply by a cover to be additionally supplied.

The interior facing surfaces of the layers are in addition provided with at least one cooperating set of securement elements comprising a projection extending out of one facing surface and a cooperating depression, conformed in shape to the projection, in the other facing surface. The securement elements enable the layers to snap or catch together without additional means, such as glue, being needed. The only requirement is that the production form be given the respective conformation.

The foamed body layers may be readily produced in a molding operation which creates the desired interior surface profile.

In one embodiment, there is a first cooperating set of securement elements comprising a projection on one facing layer and a depression in the other facing layer. Both securement elements have a general direction of extension that is longitudinal along the wide longitudinal dimension of the sun visor. There is a second cooperating set of securement elements comprising a projection and a conforming depression that have a general direction of extension that is transverse to the longitudinal dimension.

The cooperating projections and depressions enhance the ability of the two layers to be held together after assembly and ensure that the foamed layers will not shift laterally with respect to each other. Rapid assembly is facilitated because when the projections and depressions are properly aligned and mate with each other, the body layers are properly aligned. Furthermore, the increased area of the facing surfaces caused by the projections and depressions further strengthens the visor.

In the one visor embodiment, the projection and depression combination extend along the longitudinal dimension of the visor near its middle region. This arrangement is advantageous if the sun visor has a curvature along its longitudinal dimension, as discussed below.

In another embodiment of the visor, the corresponding projection on one layer and depression in the other layer are both of a cooperating serpentine curvature extending generally along the longitudinal dimension of the visor for a sufficient distance to provide a large surface area for the interconnection of the cooperating projection and depression. The curvature includes a number of arcuate sections which have the beneficial feature of preventing lateral shifting of the padding layers in any direction. The different radii of the arcuate sections ensures that the two layers will meet only at a particular orientation, and not at any laterally shifted orientation.

Visors may be gradually or sharply curved at some point along their longitudinal dimension about an axis transverse to this dimension in order to fit properly into the vehicle. It is desirable that the cooperating profile of securement elements extend on both sides of any curvature, to ensure adequate securement across the entire longitudinal dimension of the visor. Otherwise, if the two visor layers are not of precisely the same dimensions, the layers may spring apart.

While the bend or curvature line of the foamed body could be adversely affected by the securement elements passing across it, it has been found that a direct transverse crossing of this line produces no disadvantages.

In a different embodiment, there is a one-piece padded visor body consisting of two rigid layers with a film like hinge joining the layers and the layers and hinge all are formed in one operation of uniform material. The body, when opened, can readily receive the reinforcing liner, and when the body is folded, it has a completely closed surface.

In a variation of this embodiment, the visor is formed of two molded foam material layers, which are hingeable by a single film-like hinge.

To increase the optical effect of the sun visor, the mold for the visor material could also be provided with a cover of uniform material, such as a foil, of a single piece which, irregularly constructed, forms an outer optically advantageous, self-contained skin.

The method of production of the hinged embodiment of the sun visor is as follows. In a mold provided with recesses for the reinforcing insert and depressions and projections for the adhering securement elements, an open and unfolded two-section body of foam material, connected by means of a thin layer of elastic material forming a film hinge, is formed. Then the body is provided with a corresponding reinforcing insert embedded in the recesses. Next, the layers are folded into the final padded body while the securement elements are simultaneously snapped together.

The embodiments of the present invention will become apparent from the following description of the accompanying drawings, in which:

FIG. 4 is a plan view of the interior facing surfaces of a sun visor in accordance with an alternate embodiment of the invention;

FIG. 5 is a cross section through line A-A of FIG. 4; and

FIG. 6 is a cross section of the sun visor of FIG. 4 in closed position.

The padded sun visors shown in all of the drawings comprise a body of foamed plastic, e.g. a known foamed polymer plastic, such as those described in *Modern Plastics Encyclopedia*, 1967, Volume 44, pp. 348–80, published by McGraw-Hill, New York and in the references cited in this publication. *The Textbook of Polymer Science* by Fred Billmeyer, Jr., Second Printing, 1964, published by John Wiley & Sons, at pp. 230–33, 477–79, 481 and 496, concerns different polymers suitable for making solid plastic foamed bodies.

Figure 1:
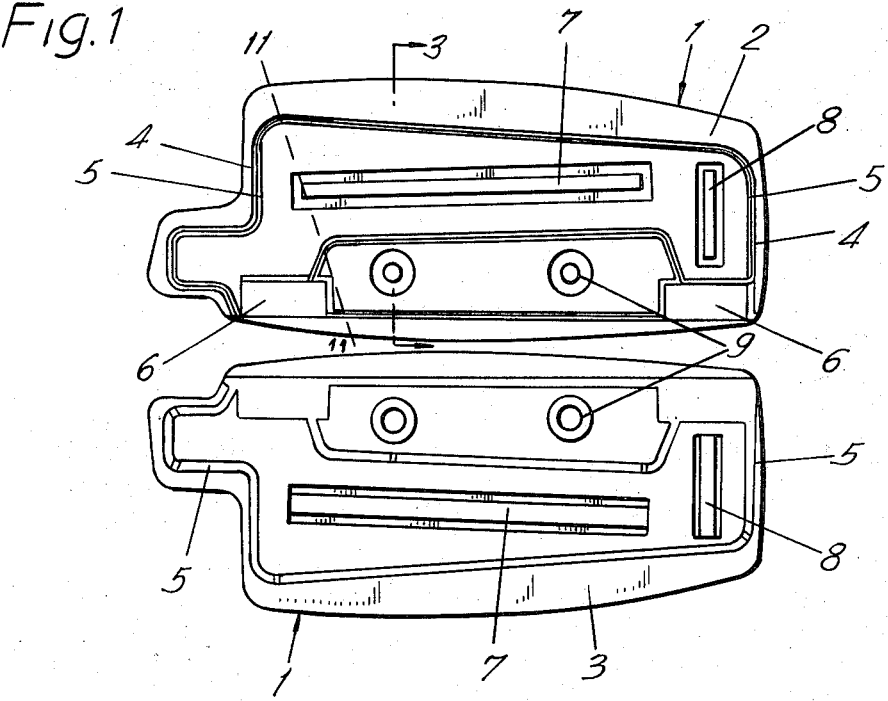
FIG. 1 is a plan view of the complementary interior facing surfaces of two foamed layers forming the body of a sun visor in accordance with one embodiment of the invention.
Figure 3:
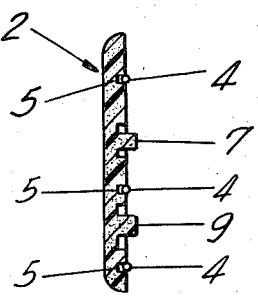
FIG. 3 is a transverse cross-sectional view through one of the foamed body layers of FIG. 1 along the line and in the direction of arrows 3—3.

Body 1 of FIGS. 1 and 3 is comprised of two preshaped, generally elongated, generally rectangular foamed body layers 2 and 3. The peripheral edges of the body layers define the final profile of the completed visor including the various body curvatures seen on a normal sun visor.

The respective facing surfaces of layers 2 and 3, which are viewable in FIG. 1, are superposed upon each other and enclose between them the reinforcing insert 4, which reinforces body 1 against deformation. Reinforcing insert 4 is flat, of a generally rectangular shape corresponding to the peripheral contour of and is located near the periphery of visor body 1. For example, insert 4 may be made of a strong steel wire frame of the required contour and shape.

Each of layers 2 and 3 is provided with a respective recess 5 which is shaped to the contour of insert member 4. The recesses 5 in each layer are aligned. Each recess 5 has a depth approximately half the thickness of insert 4 whereby when layers 2 and 3 are superposed, insert 4 extends into each of them. Recess 5 may be rounded or pointed wedge shaped, but the shaping and depth thereof are selected to enable the walls around the recess to contact and hold insert member 4 at the correct height.

Insert 4 is held in layer 2 by bearing sheets 6 which are secured to the interior surface of layer 2, extend across recess 5 and are received in cooperating receiving recesses on the facing interior surface of layer 3.

The facing surfaces of layers 2 and 3 are preferably generally flat so that virtually their entire surface areas come into engagement.

To enhance the securement together of the padding layers and to prevent their shifting with respect to each other once they are secured, the interior surfaces of the padding layers are provided with at least one respective profiled securement element, with the corresponding securement elements 7 of the layers 2 and 3 cooperating. On body layer 3 there is a projection which extends along the longitudinal dimension of extension of the body layer 3 generally midway between the longitudinal edges (top and bottom edges in FIG. 1) of layer 3. The projection mates with the conformingly deep, shaped and positioned depression in body layer 2, whereby the surfaces of the projection engage the surfaces defining the depression.

A second set of cooperating profiled securement elements 8 is provided, including another projection on layer 3 that mates with a similarly conformingly shaped depression in layer 2. The securement elements 8 extend in a direction transverse to the longitudinal direction of the extension of the visor body. Both sets of securement elements provide extended profiled securement elements preventing relative shifting of layers 2, 3 in all directions.

There may also be further cooperating projections and depressions 9 which aid in holding the body layers at the desired orientation.

The completed visor body may be curved along its longitudinal dimension around the imaginary curvature line 11 transverse to its longitudinal dimension, as illustrated in FIG. 1. To ensure complete securement of the visor body layers despite this curvature, profiled securement elements 7 extend transversely across the curvature line 11 and the axis of body curvature and are on both sides of the line 11.

Figure 2:
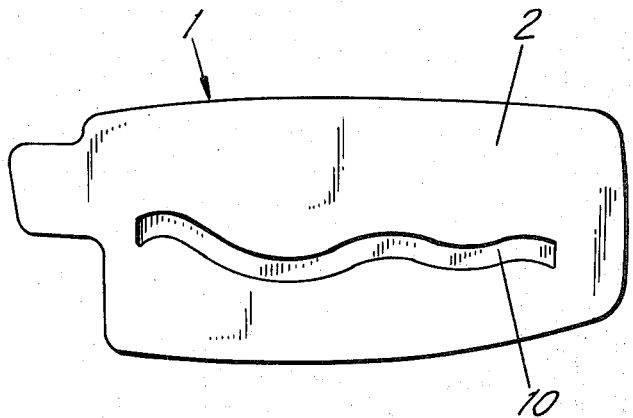
FIG. 2 is the same plan view of one visor body layer showing an alternate form of the securement elements for the body layers of FIG. 1.

FIG. 2 illustrates an alternate shape for a profiled securement element 10. Element 10 could substitute for all of the securement elements 7, 8 and 9. The cooperating profiled elements 10 on the padding body layers 2 and 3 are, respectively, for body layer 3 a projection and for body layer 2 a depression. Both are identicaly shaped serpentine arrangements, comprising a plurality of arcuately shaped curvatures, with the various arcs being curved about different radii. While the arcuate curvatures may be separated, in FIG. 2 they are illustrated as being continuous and adjacent to each other. Since the consecutive arcuate sections are of different shape, the visor body layers may be assembled together only in a unique superposed relationship, thereby ensuring proper alignment of the body layers.

In another embodiment shown in FIGS. 4-6, body 21 is contoured and dimensioned to aid in forming the completed sun visor. The contours are such, as shown by a comparison of FIGS. 5 and 6, that layers 22 and 23 can be folded together through hinge 24. The reinforcing insert 25 is held in the contours of visor 21 between layers 22 and 23. Insert 25 is held at its two end zones by bearing sheets 27. These bearing sheets are likewise received in special predetermined depth recesses in sections 22 and 23, not specifically indicated, to compensate for their configuration.

In the manufacture of visor 21, insert 25 is readily emplaceable in visor body 21. It is optional whether layers 22 and 23 are held flat with relation to each other, as in FIG. 4, or in pocket-like fashion, at an acute angle to each other, when the insert 25 is introduced. An angled position having an angle small enough so that a pocket for the reception of insert 25 is formed would appear suitable.

Recesses 26 have a plurality of dam-like cross pieces 28 crossing the recesses. The recesses are staggered, one to each of layers 22 and 23. Crosspieces 28 compensate for the cross-sectional tolerances of the wire of insert 25 and of the recesses 26 receiving the insert and compensate if imperfectly flat inserts are emplaced in the stretched and flat visor body 21.

The further contours of the inside surfaces of layers 22 and 23 serve for the securement of the two facing surfaces of layers 22 and 23, as shown in cross section in FIG. 6.

The adherence profile of body 21 includes securement elements, i.e. projections or ribs and depressions 29, 30. The depressions are in layer 22 and the ribs are in layer 23. The depressions in section 22 are laterally bordered by protruding edges which, when the visor body is closed, engage in recesses that laterally border the protruding ribs in layer 23. This profiled cross-sectional design results in great layer adherence. Since the sun visor body is comprised of an elastic foam material, ribs and recesses 29, 30 running diagonally to the edge of visor body 21 are oblique in such a way that undercuts are formed against a dislocation of the adhering profiles. This also facilitates snapping layers 22, 23 together.

Additionally, there are two circular adhering profiles 31 disposed near hinge 24 operating like push buttons. In cross section, profiles 31 largely correspond to securement elements 29 and 30 and achieve the same effect.

While the sun visors have been described as having particular shapes and as employing particularly profiled securement elements, other shaped sun visors and securement elements may be used.

The complete assembly of the sun visor, including the body layers, may be enclosed in a conventional way by an adhering film enclosure (not shown).

Although preferred embodiments of this novel invention have beeen described, many variations and modifications will now be apparent to those skilled in the art. Therefore, this invention is to be limited, not by the specific disclosures herein, but only by the appended claims.

We claim:

1. A sun visor for motor vehicles, or the like, comprising a padded body and a reinforcing insert carried within said body;
   said body comprising two superposed padded layers of foam material between which said insert is positioned;
   both said layers having an interior surface extending entirely across said layer and being in engagement with and affixed to said interior surface of the other said layer; at least one of said interior surfaces including a recess corresponding in shape and depth to said insert for receiving said insert and for also permitting contact between said interior surfaces with said insert in position in said recess therefor;

said interior surfaces also being provided with cooperatingly shaped profiled securement elements which mate so as to hold said layers together.

2. The sun visor of claim 1, wherein it is both said interior surfaces that include cooperating recesses for together receiving said insert; said cooperating recesses being provided with a plurality of cross pieces crossing said recesses for holding said insert in said recesses therefor.

3. The sun visor of claim 1, wherein said securement elements comprise a projection extending out of one said interior surface and a cooperatingly shaped and correspondingly positioned mating depression in the other said interior surface.

4. The sun visor of claim 3, wherein said reinforcing insert extends generally around said visor body, generally in the vicinity of its periphery;
   said securement elements being located in said visor body within the area defined by said insert.

5. A sun visor for motor vehicles, or the like, comprising a padded body and a reinforcing insert carried within said body;
   said body comprising two superposed padding layers of foam material between which said insert is positioned;
   both said layers having an interior surface in engagement with and affixed to said interior surface of the other said layer; at least one of said interior surfaces including a recess corresponding in shape and depth to said insert for receiving said insert and for also permitting contact between said interior surfaces with said insert in position in said recess therefor;
   said interior surfaces also being provided with cooperatingly shaped profiled securement elements which mate so as to hold said layers together; said securement elements comprising a projection extending out of one said interior surface and a cooperatingly shaped and correspondingly positioned mating depression in the other said interior surface;

said body having a longitudinal dimension of extension;
   said securement elements comprising: out of said interior surface of one said layer projects a securement element extending generally in the direction of said longitudinal dimension of said body; out of said interior surface of one said layer also projects a transverse securement element extending generally transversely to said longitudinal dimension of said body and arranged transversely to said longitudinally extending securement element; for each said projecting securement element, the said interior surface of the other said layer is provided with a corresponding depression, each of which said depressions conforms in shape, depth and position to the shape, height and position of a respective said projection, whereby the surfaces of each said projection are in engagement with the surfaces defining each said depression.

6. The sun visor of claim 5, wherein said visor body has a predetermined peripheral contour about its periphery and said insert is shaped correspondingly to said contour and is positioned near the periphery.

7. A sun visor as claimed in claim 5, wherein said visor has opposite longitudinal edges extending along the said longitudinal dimension of said body and said longitudinally extending securement element is interposed generally midway between said body longitudinal edges.

8. A sun visor as claimed in claim 5, wherein both said longitudinally extending and said transversely extending securement elements together are comprised of a serpentine shaped projection extending generally longitudinally along said visor body; the respective said corresponding depressions have the same said serpentine shape.

9. A sun visor as claimed in claim 8, wherein said serpentine shape comprises a plurality of arcuate sections each curved about a different respective radius.

10. A sun visor as claimed in claim 5, wherein said visor body is curved along its said longitudinal dimension about an axis transverse to said longitudinal dimension;

at least one of said projecting securement elements and its said corresponding depression being on each side of the said curvature of said body.

11. A sun visor as claimed in claim 10, wherein at least one said securement element and its corresponding said depression is arranged to extend transversely to said axis of curvature of said body.

12. A sun visor as claimed in claim 5, wherein said visor body is curved along its said longitudinal dimension about an axis transverse to said longitudinal dimension;

at least one said securement element and its cooperating said depression being arranged transverse to said axis of curvature of said body.

13. The sun visor of claim 5, further comprising a foldable hinge connected to and joining a respective edge of each said body layer, whereby said layers may be folded apart to permit insertion of said insert and may be folded together to enclose said insert and to cause said shaped profiles to mate.

14. A sun visor for motor vehicles, or the like, comprising a padded body and a reinforcing insert carried within said body; said body comprising two superposable layers held together by a foldable hinge extending along one respective edge of each said layer; said insert being held between said layers when they are superposed; both said layers having an interior surface extending entirely across said layer and being engageable with and affixable to said interior surface of the other said layer; at least one of said interior surfaces including recesses corresponding in shape to said insert for receiving said insert between said layers.

15. The sun visor of claim 14, wherein said interior surfaces are further provided with cooperatingly shaped profiled securement elements which mate to hold said layers together.

* * * * *